United States Patent
Demchak et al.

(10) Patent No.: US 8,274,510 B2
(45) Date of Patent: Sep. 25, 2012

(54) METHOD AND APPARATUS FOR VISUALIZING A QUANTITY OF A MATERIAL USED IN A PHYSICAL OBJECT HAVING A PLURALITY OF PHYSICAL ELEMENTS

(75) Inventors: Gregory L. Demchak, Cambridge, MA (US); Lillian M. Smith, Cambridge, MA (US)

(73) Assignee: Autodesk, Inc., San Rafael, CA (US)

( * ) Notice: Subject to any disclaimer, the term of this patent is extended or adjusted under 35 U.S.C. 154(b) by 700 days.

(21) Appl. No.: 12/266,969

(22) Filed: Nov. 7, 2008

(65) Prior Publication Data

US 2010/0118026 A1    May 13, 2010

(51) Int. Cl.
   *G06T 15/00* (2006.01)
   *G06T 15/50* (2006.01)

(52) U.S. Cl. ........ 345/420; 345/419; 345/421; 345/426; 345/428; 345/619; 345/621; 345/626; 345/629; 345/636; 345/440; 345/440.2; 345/581; 345/594; 382/113; 705/28

(58) Field of Classification Search .......... 345/419, 345/428, 581, 594, 420, 421, 426, 619, 621, 345/626, 629, 636, 440, 440.2; 382/113; 705/28
See application file for complete search history.

(56) References Cited

U.S. PATENT DOCUMENTS

| | | | |
|---|---|---|---|
| 7,268,782 B2 * | 9/2007 | Ebert | 345/440 |
| 7,283,975 B2 * | 10/2007 | Broughton | 705/28 |
| 7,286,130 B2 * | 10/2007 | Iguchi et al. | 345/440 |
| 7,479,959 B2 * | 1/2009 | Han et al. | 345/420 |
| 2004/0054568 A1 * | 3/2004 | Bradley et al. | 705/7 |
| 2005/0049910 A1 * | 3/2005 | Lancaster et al. | 705/10 |
| 2005/0162419 A1 * | 7/2005 | Kim et al. | 345/419 |
| 2009/0073171 A1 * | 3/2009 | Straub et al. | 345/440 |
| 2010/0073373 A1 * | 3/2010 | Groff et al. | 345/440 |
| 2010/0138266 A1 * | 6/2010 | Nichols et al. | 705/8 |

* cited by examiner

*Primary Examiner* — Xiao M. Wu
*Assistant Examiner* — Todd Buttram
(74) *Attorney, Agent, or Firm* — Gates & Cooper LLP

(57) ABSTRACT

A method, apparatus, article of manufacture for illustrating progress in achieving a goal of a system modeled by a computer program. In one embodiment, the invention is evidenced by a method comprising the steps of displaying a widget wherein the widget comprises a center portion representing a category of data represented by the computer program and the category of data includes n data points that must be fulfilled to achieve the goal and an outer portion, comprising a segment representing each one of the n data points; and updating the widget to represent each of the n data points that has been fulfilled by delineating each segment representing a fulfilled data point requirement from each segment representing a non-fulfilled data point requirement.

10 Claims, 12 Drawing Sheets

METHOD AND APPARATUS FOR VISUALIZING A QUANTITY OF A MATERIAL USED IN A PHYSICAL OBJECT HAVING A PLURALITY OF PHYSICAL ELEMENTS

BACKGROUND OF THE INVENTION

1. Field of the Invention

The present invention relates to systems and methods for providing information to users of computer programs, and in particular to a method and apparatus for visualizing a quantity of material used in a physical object modeled on a computer.

2. Description of the Related Art

Computer programs have long been used to assist users in the completion of a wide variety of projects. Examples of such computer programs include computer-aided design (CAD) and computer aided manufacture (CAM) programs. Typically, the use of such programs involves a complex series of user commands to define or select system parameters that are used in the design. Often times, the goal of the design process is to define a system that maximizes (or minimizes) certain criteria based on the selection of design parameters. Such parameters may be defined by the user or imposed upon the user by regulatory agencies or customers. One example of a design process subject to maximizing criteria based upon the selection of design parameters is the use of CAD/CAM software to design a building that will comply with Leadership in Energy and Environmental Design (LEED) requirements. Buildings can be LEED certified, providing an independent, third party verification that a building project is environmentally responsible, profitable and healthy place to live and work. LEED certification requirements are publicly available from the U.S. Green Building Council at http://www.usgbc.org/, which is incorporated by reference herein.

By their very nature, design projects associated with buildings can be enormously complex. Large and complex physical objects such as buildings can easily comprise hundreds of thousands of elements. While it is often the case that different materials are used for different objects, it is also the case that many of these elements may be fashioned from the same material as other elements. For example, concrete is a common construction material that is put to a wide variety of different element types.

To achieve LEED certification, it is often required that particular elements of a building design be constructed with material of a particular composition or legacy. For example, the material may be either made from a material that is recyclable, or from a material that already has been recycled.

Currently, to determine which portions of a building are manufactured of a particular material, the user must select or multiple select portions of the model (typically by clicking on portions of the model) and request the desired information. The problem is that this can be a lengthy and arduous task when a particular material is used to construct a large number of elements. Concrete, for example, is a common building material, and selecting each and every element made of concrete would be a difficult task. What is needed is a system and method that provides a convenient view of how much of a given building model is composed of a particular building material. The present invention satisfies that need.

SUMMARY OF THE INVENTION

To address the requirements described above, the present invention discloses a method, apparatus, and article of manufacture for visualizing a quantity of a material used in a physical object having a plurality of physical elements. In one embodiment, the method is evidenced by the steps of displaying a visual representation of a model of the physical object and a display feature associated with at least one of the physical elements of the object on a display coupled to a computer, wherein the display feature is displayed concurrently with the visual representation, accepting a selection of the display feature in the computer from the user, filtering the model according to the selected display feature to highlight the physical element of the object associated with the selected display feature and displaying a visual representation of the filtered model. In another embodiment, the present invention is evidence by apparatus is evidenced by a means for performing the above steps. In yet another embodiment, the invention is evidenced by a computer system having a processor and a memory coupled to the processor, the memory storing one or more instructions for performing a computer program modeling the physical object and for presenting the visualized quantity of material used in the physical object, wherein the instructions comprise instructions for performing the above steps.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
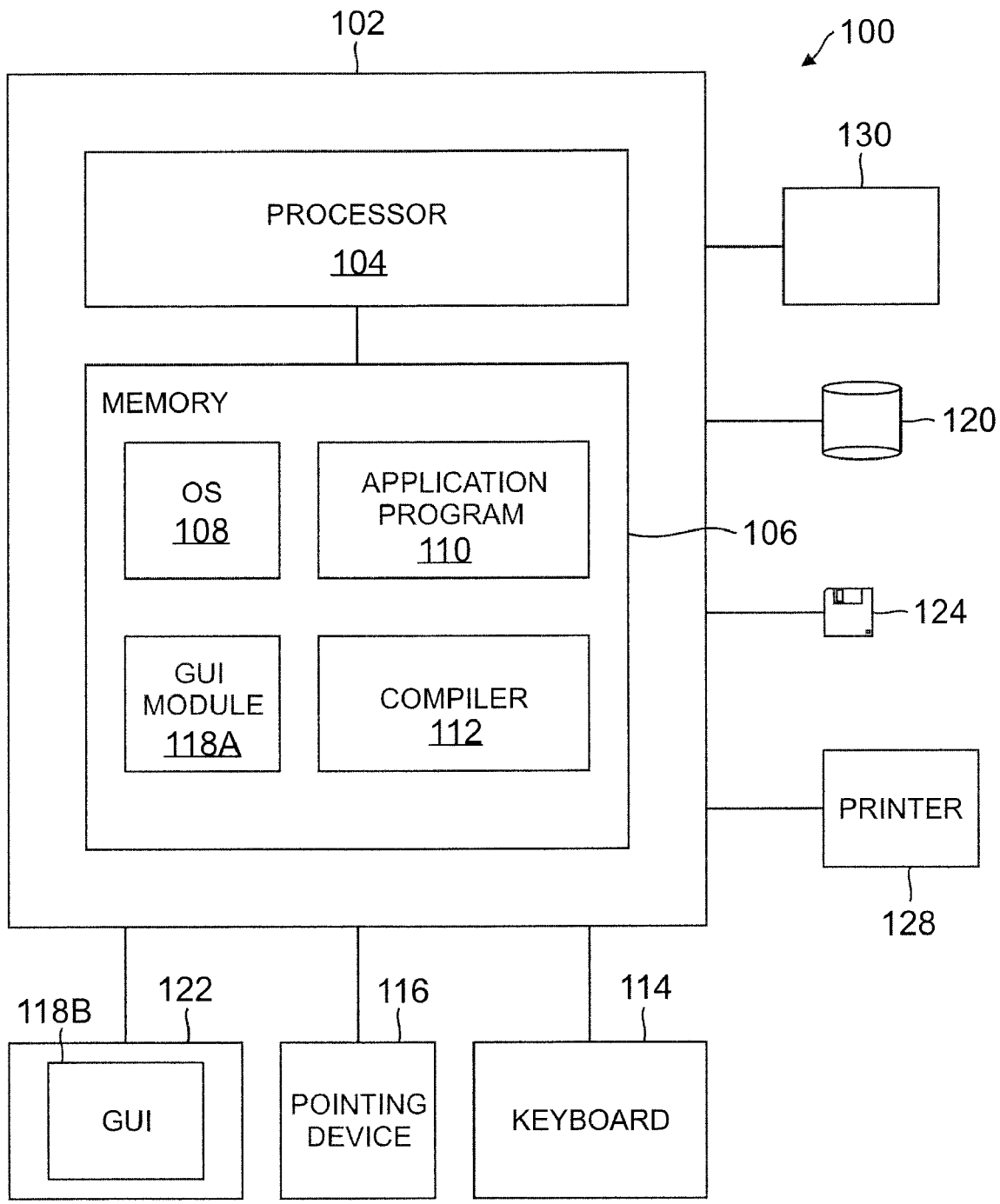
FIG. 1 is a diagram illustrating an exemplary computer system that could be used to implement the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
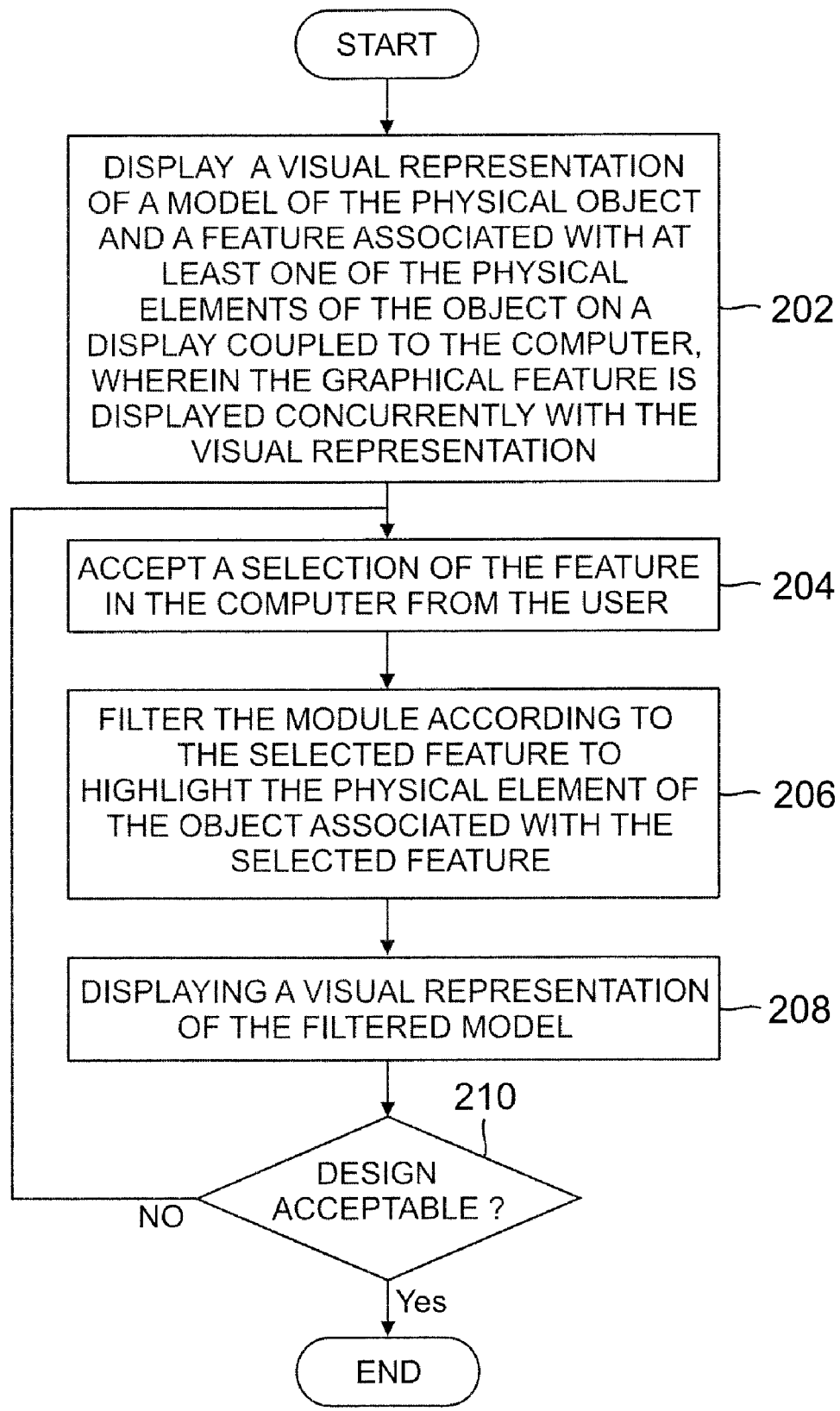
FIG. 2 is a diagram of illustrative method steps that can be used to practice one embodiment of the invention.

FIG. 2 is a diagram of illustrative method steps that can be used to practice one embodiment of the invention. A computer program is provided which models one or more physical objects, each having a plurality of physical elements. For example, the computer program may model a building having physical elements such as floors, beams, wall, roofs, windows, doors, fixtures, support structure, and other physical elements. Each of the physical elements may be a member of one or more hierarchically related sets or subsets of physical elements. For example, the "fixtures" element could include subset elements such as plumbing, and subsets of the subset elements such as toilets or sinks.

In block 202, a visual representation of a model of the physical object is displayed, along with a feature associated with at least one of the physical elements of the physical object. The model typically comprises a description of the elements of the physical object (e.g. the size, composition, shape, strength, color) and a functional relationship between that element and the other elements that together form the object (e.g. how the element is connected to other elements and how the elements relate to one another). For example, a model may describe an I-beam of a particular size, constructed of steel, in a particular location, and connected to a crossbeam via rivets and welding.

Figure 3:
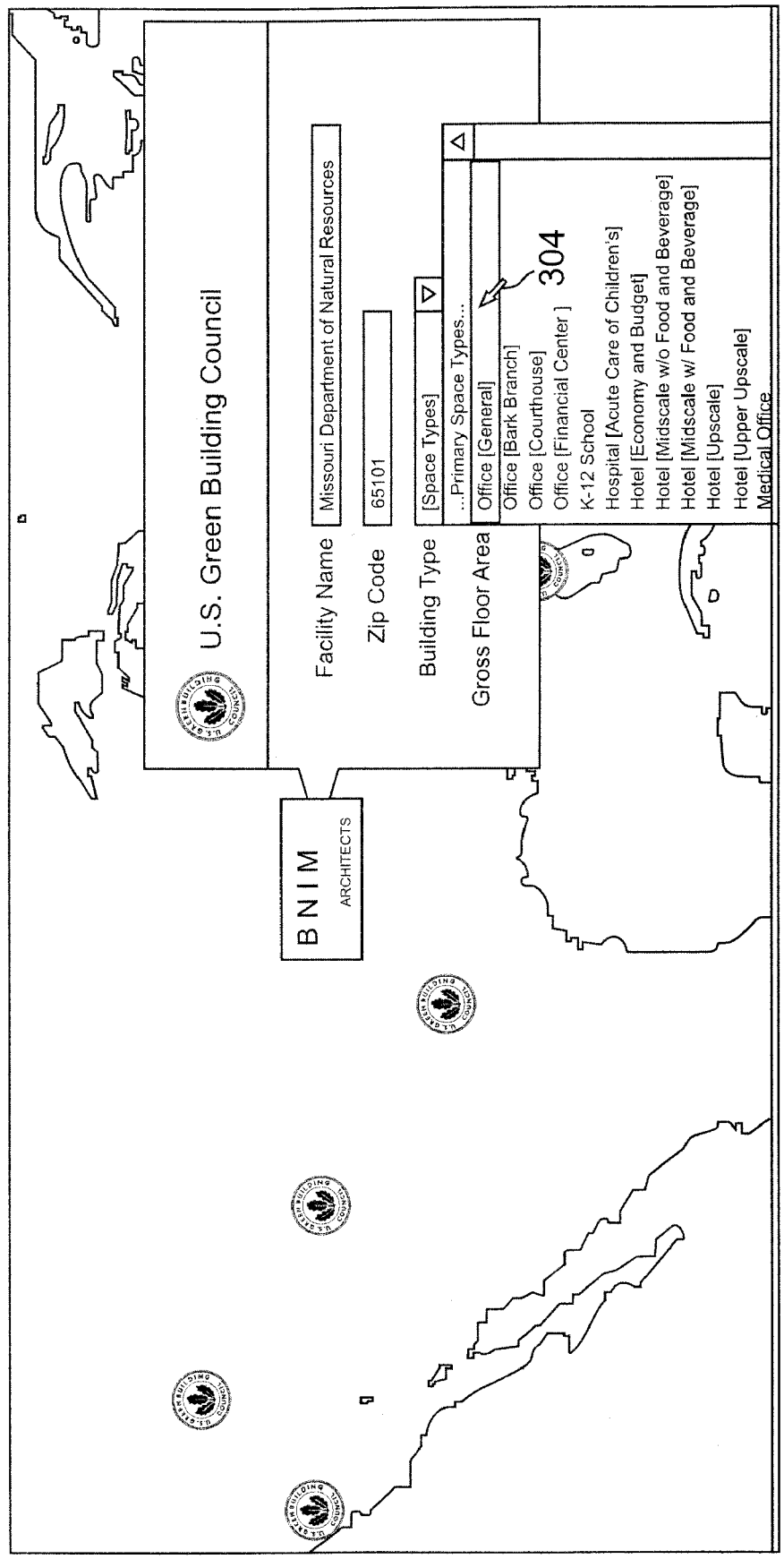
FIG. 3 is a diagram presenting an exemplary user interface to a computer program that may be used to model the physical object and to visualize the quantity of a material used in the physical object.

FIG. 3 is a diagram presenting an exemplary user interface 302 to a computer program that may be used to model the physical object and to visualize the quantity of a material used in the physical object. In the illustrated embodiment, the computer program is used to model building construction and to determine the LEED compliance of the model. The user defines the model by providing manual user input to the computer program (e.g. via pointer 304) or by providing information available from external sources such as databases. Such input could include, for example, input regarding the size, number of floors, material composition, and a host of other parameters. In FIG. 3, the user has input the facility name, zip code, and the type of space (general office space).

Figure 4:
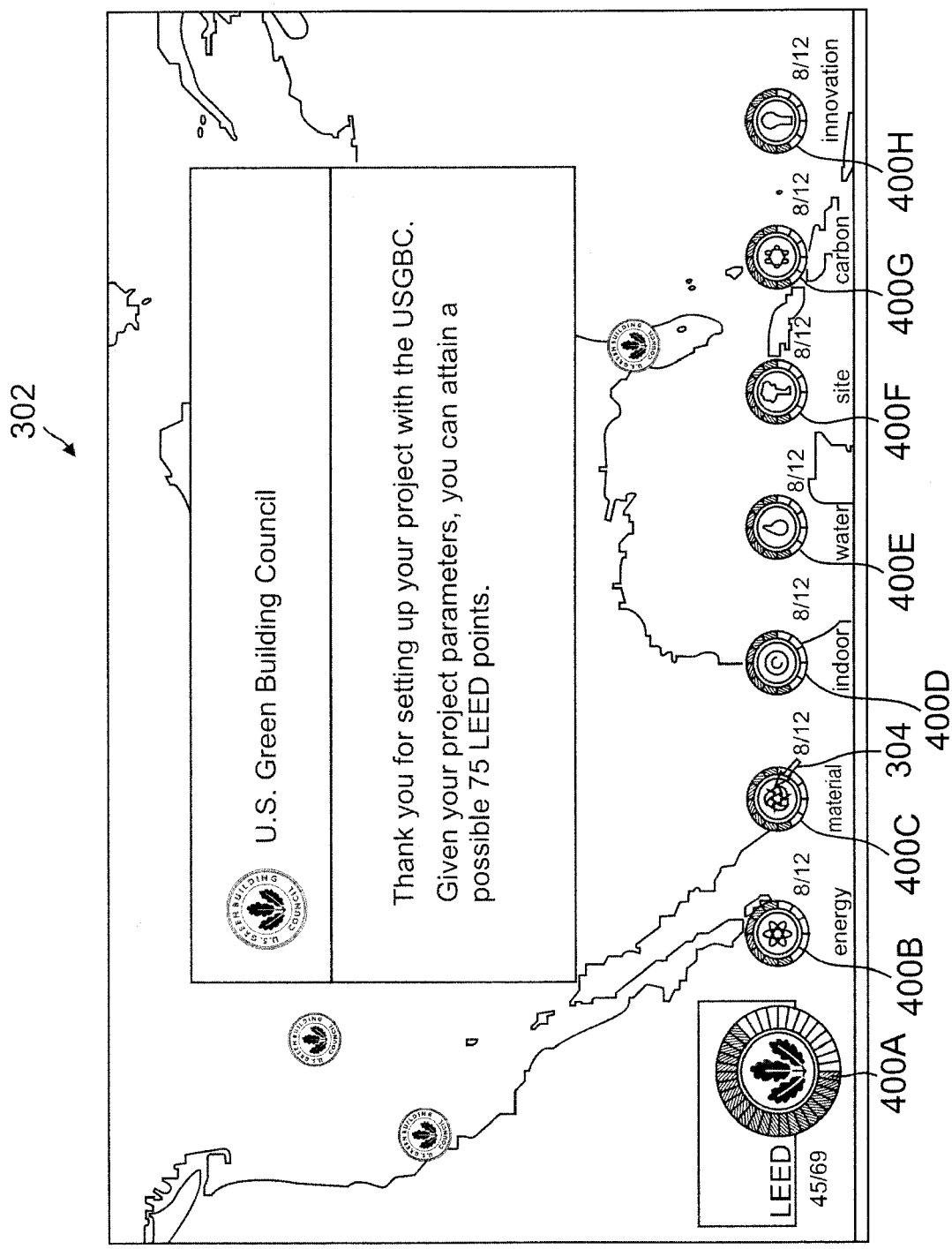
FIG. 4 is a diagram illustrating an embodiment of the user interface after the entry of preliminary information.

FIG. 4 is a diagram illustrating the user interface 302 after the building facility name, zip code, and the type of space (general office space) has been entered. Once the building has been at least preliminarily defined, the user interface 302 presents a plurality of widgets 400A-400H (hereinafter alternatively referred to as widget(s) 400) that provide a means to navigate to data categories such as different building construction characteristics, and also provide an indication of how well the modeled building design achieves the LEED design goals in each of the listed categories. The data presented in the widgets 400 is determined via execution of algorithms within the computer program.

In the illustrated embodiment, eight data categories corresponding to eight widgets 400A-400H are provided. The widgets include an energy widget 400B, a materials widget 400C, an indoor widget 400D, a water widget 400E, a site widget 400F, a carbon widget 400G and an innovation widget 400H. The widgets also include a summary widget 400A, which presents a compendium of information from all of the other widgets 400B-400H. Selection of the materials widget 400C opens a data category user interface that provides additional information regarding the materials data category.

Figure 5:
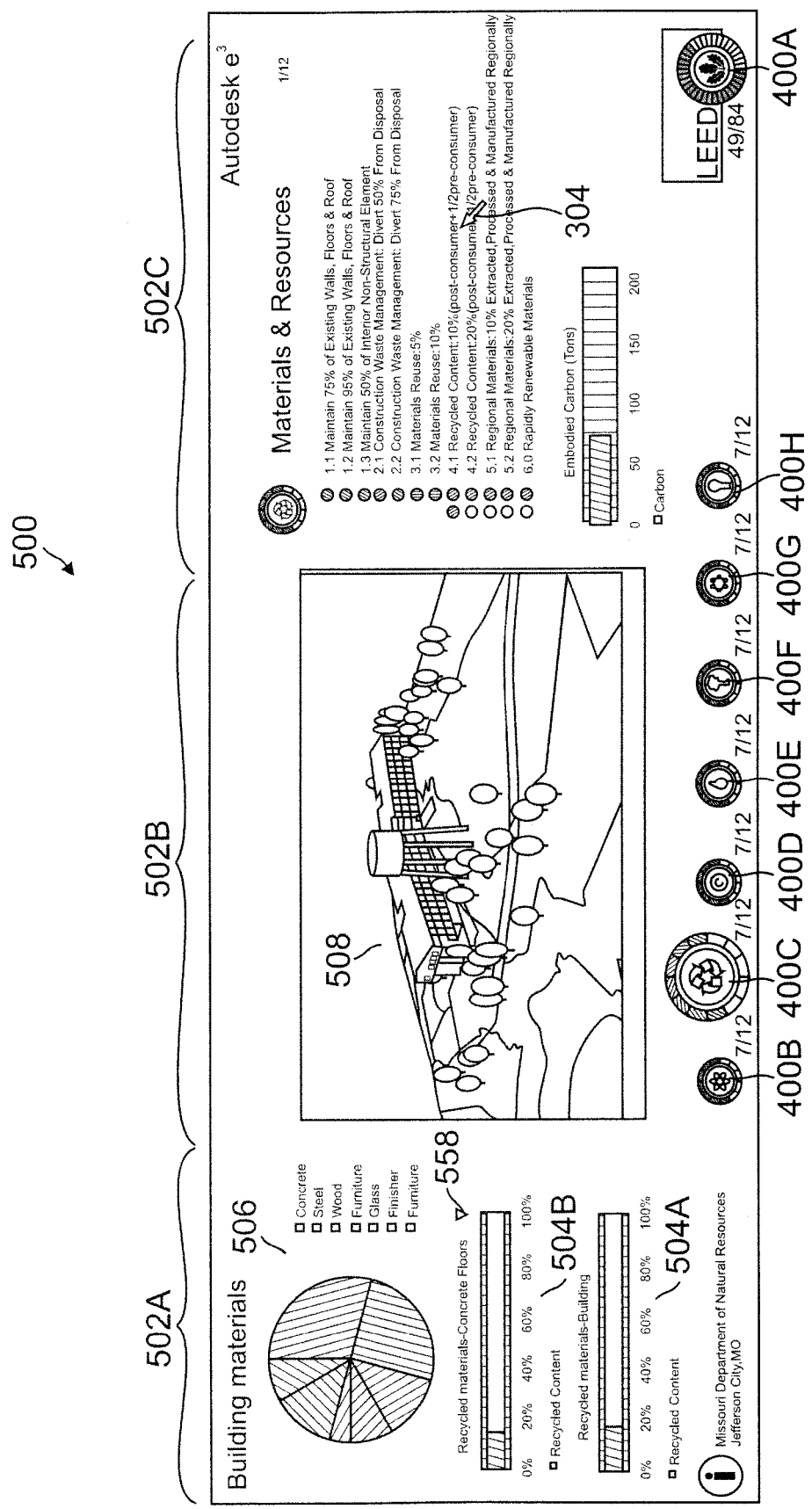
FIG. 5 is a diagram presenting an illustrative embodiment of a data category user interface.

FIG. 5 is a diagram presenting an illustrative embodiment of a data category user interface 500. The illustrated user interface 500 also presents a number of different features, including the widgets 400, and may, as illustrated, enlarge or otherwise delineate the widget 400 associated with the data category currently displayed. For example, in the illustrated embodiment, the materials widget 400C is enlarged to show that the currently displayed data category is the materials category.

The user interface 500 may be divided into a plurality of portions, including a graphical portion 502A, a rendering portion 502B, and a data point portion 502C. The data point portion 502C provides features that allow the user to input or edit information about the data points that are members of the data category. In the illustrated embodiment, the data points are represented by display features that include "Materials Reuse" percentages of 5% and 10%, "Recycled Content" percentages of 10% and 20%, "Recycled Content" of 20%, "Regional Materials" of 10% and 20%, and "Rapidly Renewable Materials."

Selection (e.g. via pointer 304) of the feature representing the "Recycled Content" data point causes one or more features such as the recycled materials graphic features 504 to be opened in the graphical portion 502A. The graphical portion 502A presents graphical information about the data category and/or data point (in the illustrated example, building materials).

The materials graphics 504 may include a first graphic feature 504A describing the selected data point or the data category. In the illustrated embodiment, the first graphic feature 504A indicates the total amount of recycled materials used in the modeled building. A third graphic feature 506 may be presented to allow the user to view subcategories of the data point, in the case illustrated, the building materials used. The user may also drill down to examine the percentage of recycled material used in the an element of the object (e.g. floors of the building), or in subsets of elements of the object (e.g. concrete floors of the building), or in building materials that are used in different elements of the building (e.g. the percentage of recycled concrete of all concrete used in the building) by selection of one or more display features. This can be accomplished for example, by use of the arrow 558, which opens a pulldown menu with inputs that can be set to different values, or by analogous means.

The rendering portion 502B presents a rendering of the modeled object 508. In the illustrated embodiment, the rendering is a 3D rendering, but a 2D rendering may be provided instead. Further, the user may, by selection of appropriate controls, alter the view of the rendering to change the perspective, or select particular elements for a more detailed view.

Returning to FIG. 2A, a selection of a feature is accepted from the user, as shown in block 204.

Figure 6:
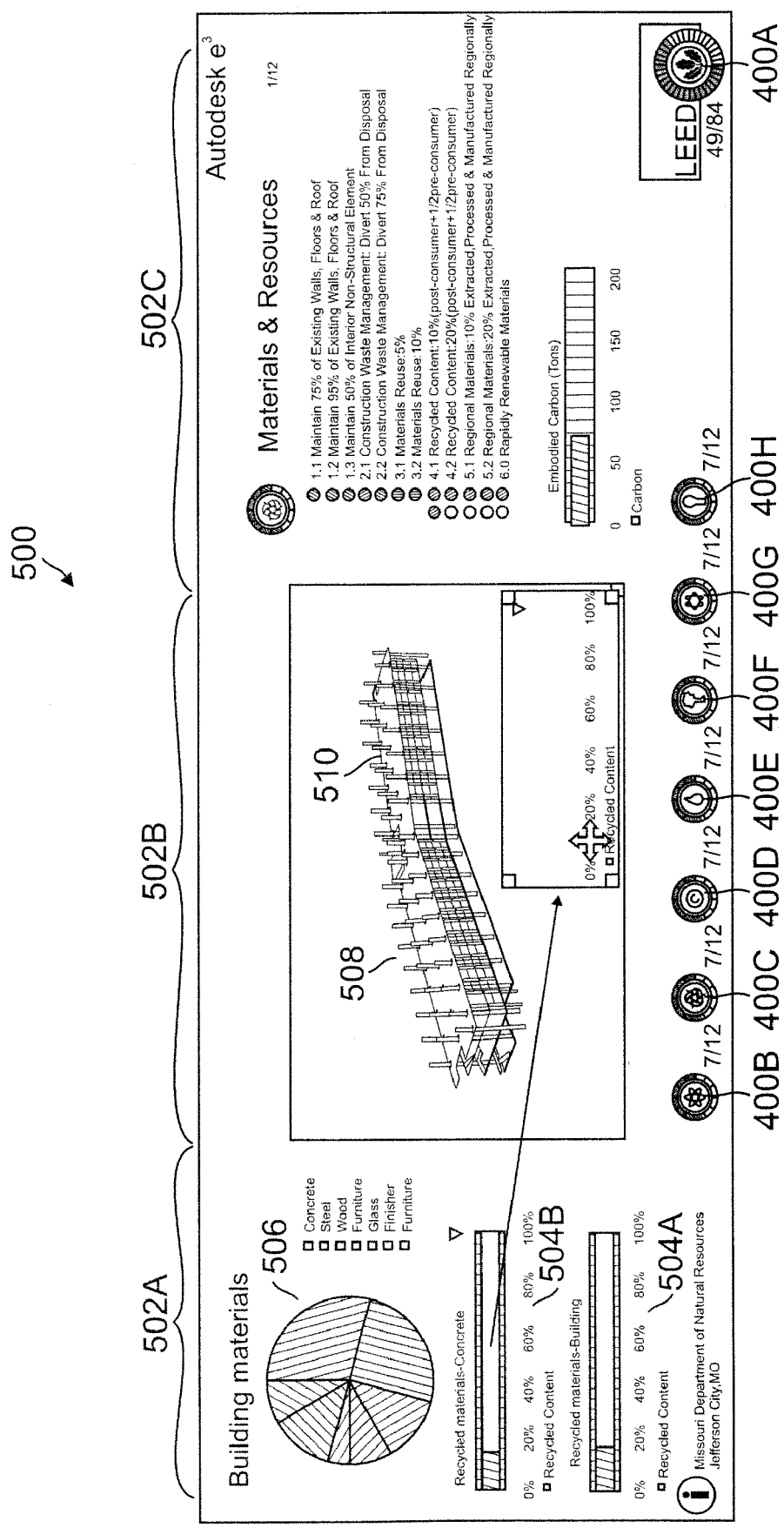
FIG. 6 is a diagram of an illustrative example of the data category user interface following selection of a feature.

FIG. 6 is a diagram of an illustrative example of the data category user interface 500 following selection of a feature. In the illustrated embodiment, the feature is selected by dragging the second graphic feature 504B representing the percentage of recycled material content for the concrete floors from the graphical portion 502A to the rendering portion 502B. The rendering portion 502B of the user interface 500 has also has been updated to remove outer structures to that the selected element 510 (e.g. the concrete floors) the concrete floors can be more easily seen.

Returning again to FIG. 2A, the model is filtered according to the selected feature to highlight the physical element of the object associate with the selected feature, and a visual representation of the filtered model is displayed, as shown in blocks 206-208.

Figure 7:
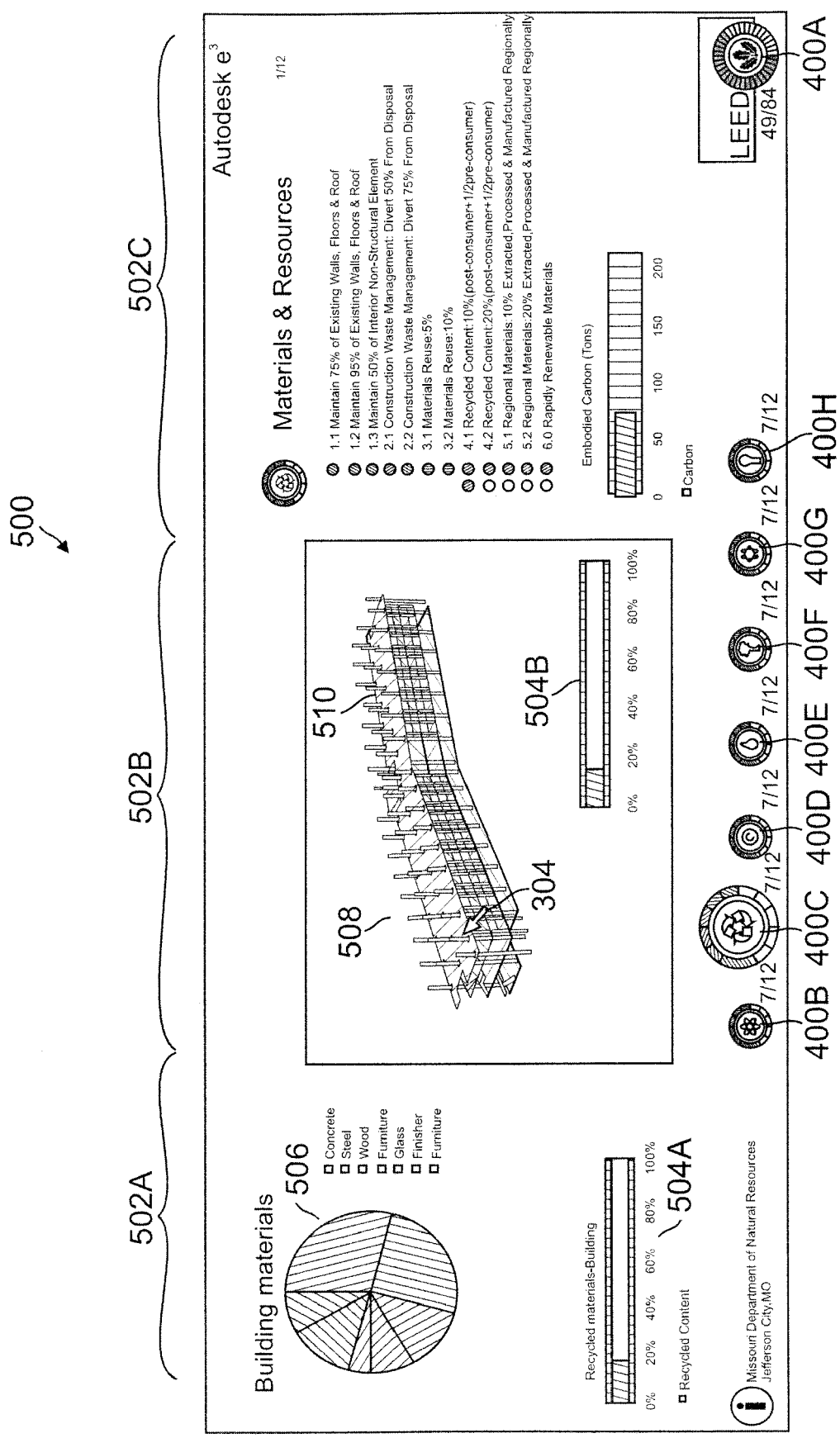
FIG. 7 is a diagram showing an exemplary embodiment of the user interface after model is filtered according to the selected feature.

FIG. 7 is a diagram showing an exemplary embodiment of the user interface 500 after model is filtered according to the selected feature. Note that the rendering portion 502B is updated to highlight the physical elements of the object associated with the selected feature. In this example, the selected element was concrete, so the object 508 is updated to highlight the building elements comprised of concrete having 20% or more recycled content.

The user may then specify another material for a particular element of the object (e.g. the floors). This can be accomplished by moving the pointer 304 over the associated element (in the illustrated example, a floor) in the graphical portion 502A, the rendering portion 502B, or the data point portion 502C, and selecting the element but other methods may be used as well.

Figure 8:
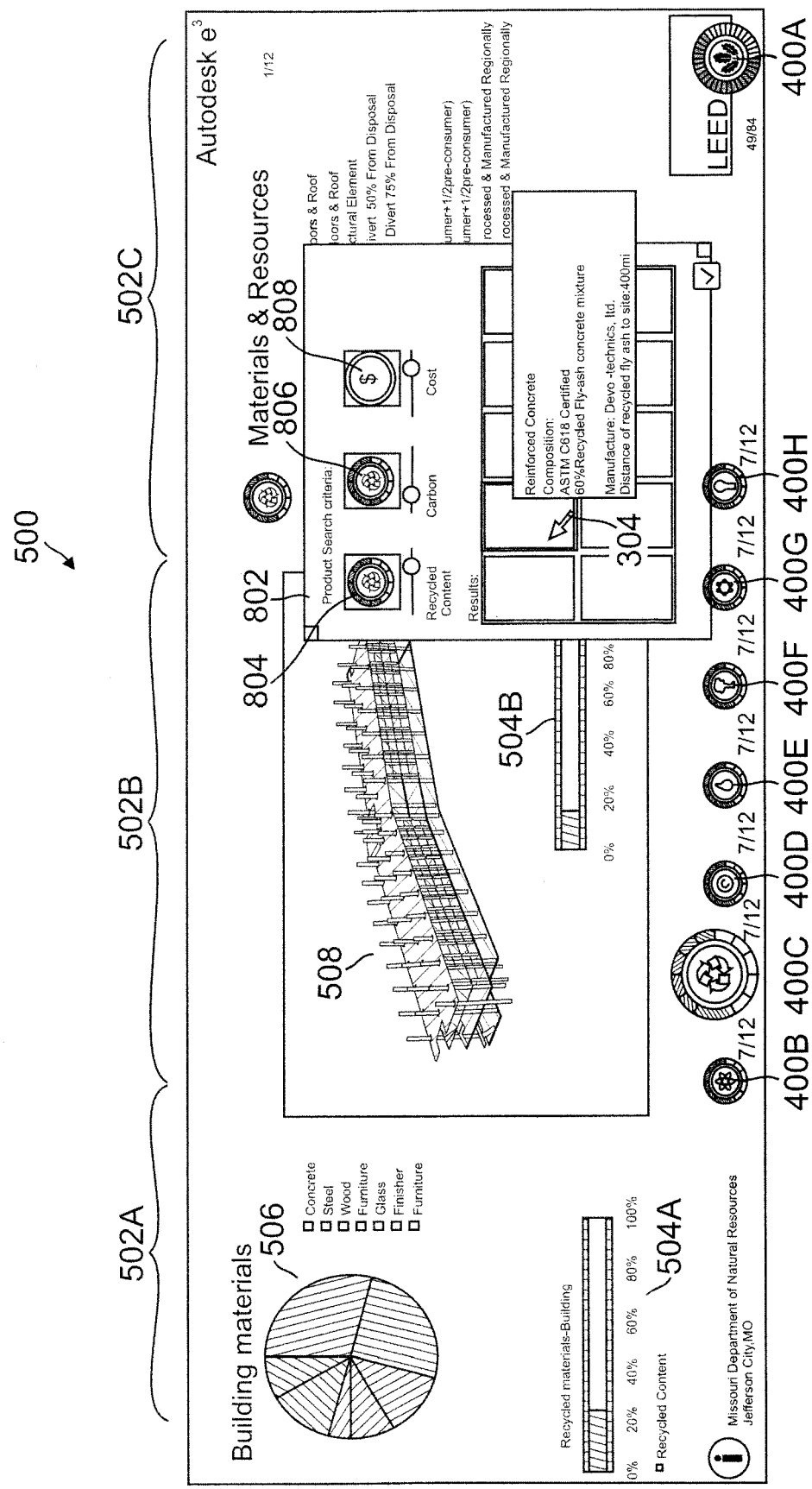
FIG. 8 is a diagram illustrating an exemplary embodiment of the user interface after an element is selected to specify a material.

FIG. 8 is a diagram illustrating an exemplary embodiment of the user interface 500 after an element is selected to specify a material. As illustrated, a materials specification window 802 is opened in the user interface 500. The user can search different products by specifying the recycled content of the product, the carbon content, and the cost, by manipulating controls 804-808. The materials specification window 802 then provides the results of the search. In the illustrated embodiment, the results include concrete compositions, available from different sources.

The user can then manipulate the pointer 304 and select the desired concrete composition. The filtered model is then updated using the selected concrete composition, and the results presented in the user interface 500.

Figure 9:
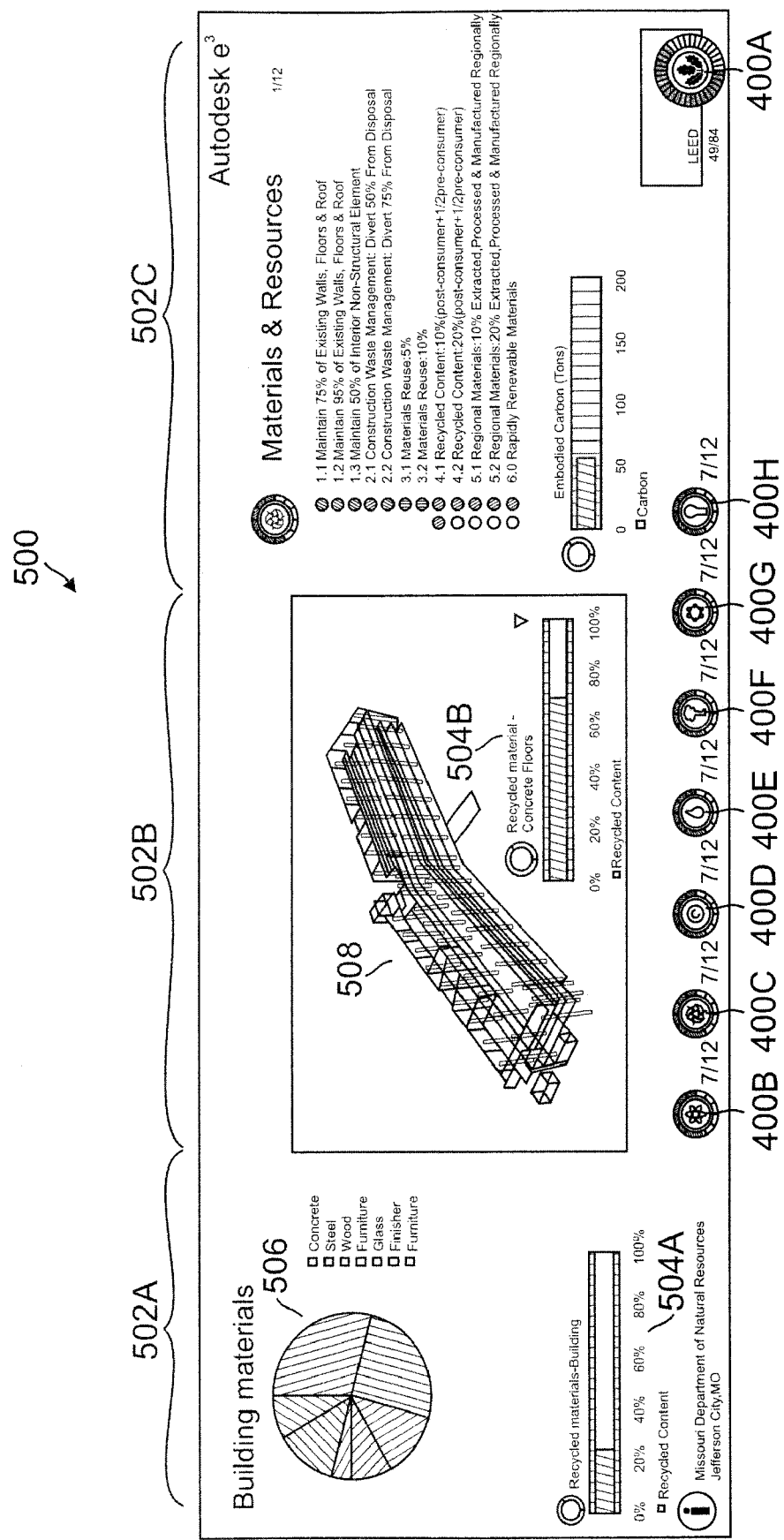
FIG. 9 is a diagram illustrating one embodiment of the result of applying a selected element composition to the visual representation of the physical model.

FIG. 9 is a diagram illustrating one embodiment of the result of applying a selected element composition to the visual representation of the physical model. In the illustrated example, a different concrete composition was selected for the floors of the building, and the model was updated accordingly. The visual representation in the rendering portion 502 is also updated to highlight the concrete floors. Since the newly selected concrete composition has a different recycled material percentage than the previously selected concrete composition, the second graphic feature 504B is updated to reflect the higher percentage of recycled content (now approximately 70%). The first graphic feature 504A, which illustrates the percentage of recycled materials for the entire object (e.g. the building) is also updated to reflect the different composition.

The operations shown in blocks 204-210 can be repeatedly performed to optimize the physical object design. For example, different concrete compositions (each possibly associated with different costs) can be used to arrive at different candidate designs, along with different compositions for other elements, the design using achieving the highest recycled content and the lowest cost can be selected for the proposed design.

In the foregoing example, model was filtered by selecting the second graphical display feature 504B associated with the element of interest (in this case, the floors) and pulling that feature within the rendering portion 502B of the user interface 500B.

Figure 10:
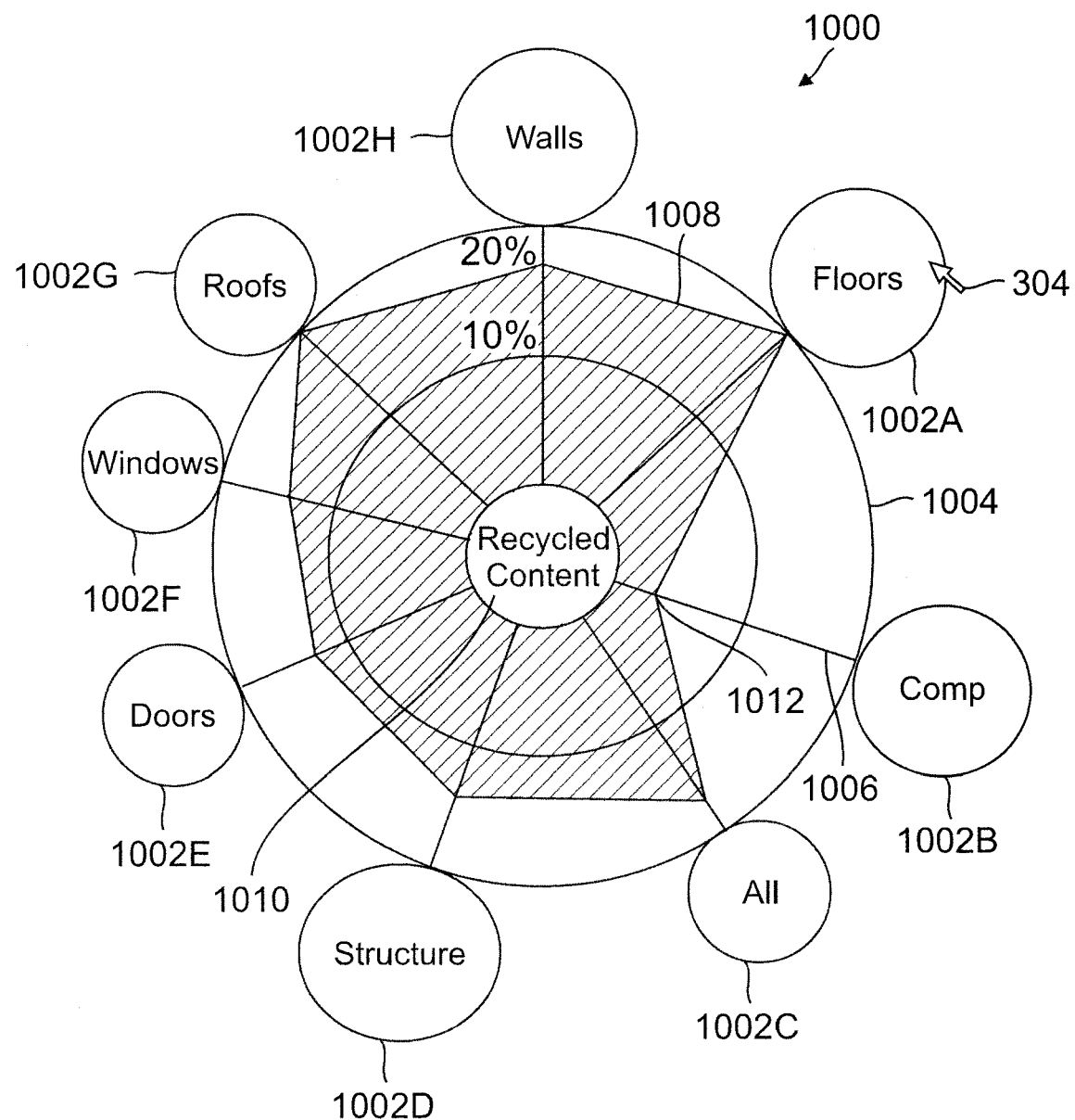
FIG. 10 is a diagram presenting another exemplary embodiment of how the user may filter the model to highlight a selected physical element of the object.

FIG. 10 is a diagram presenting another exemplary embodiment of how the user may filter the model to highlight a selected physical element of the object. In this embodiment, the selected display feature comprises a radar diagram 1000. The radar diagram 1000 can be presented in a separate window or anywhere in the user interface 500.

The radar diagram 1000 may comprise a graph 1008 having a radial line 1006 extending from a center 1010 of the radial diagram 1000 for one or more of the physical elements of the physical object. A control region 1002 is disposed proximate the end of each of the lines. The control regions 1002 are associated with a physical element of the physical object associated with the radial line 1006. For example, the radar diagram 1000 comprises a floors control region 1002A, a doors control region 1002E, a windows control region 1002F, a roofs control region 1002G and a walls control region 1002H. Control regions 1002 may also represent categories or groups of elements. For example, control region 1002B represents components and "all" control region 1002C represents all materials.

The radar diagram also includes a data point 1012 on each of the radial lines 1006. Each data point quantifies a parameter associated with the physical element of the physical object associated with the radial line 1006. For example, the data point associated with the floors display feature 1002A and floors element shows that about 20% of the floors are composed of recycled content. In this embodiment, if the user wishes to filter the model to highlight the floors, that can be accomplished by selecting the floors control region 1002A with the pointer 304.

The user may also select the element of interest by other means. For example, the elements of the object may be a member of one or more hierarchically related sets of physical elements. In such case, the user may hierarchically isolate the desired physical element from the plurality of elements, then select a feature associated with that hierarchically isolated element to update the model.

Figure 11:
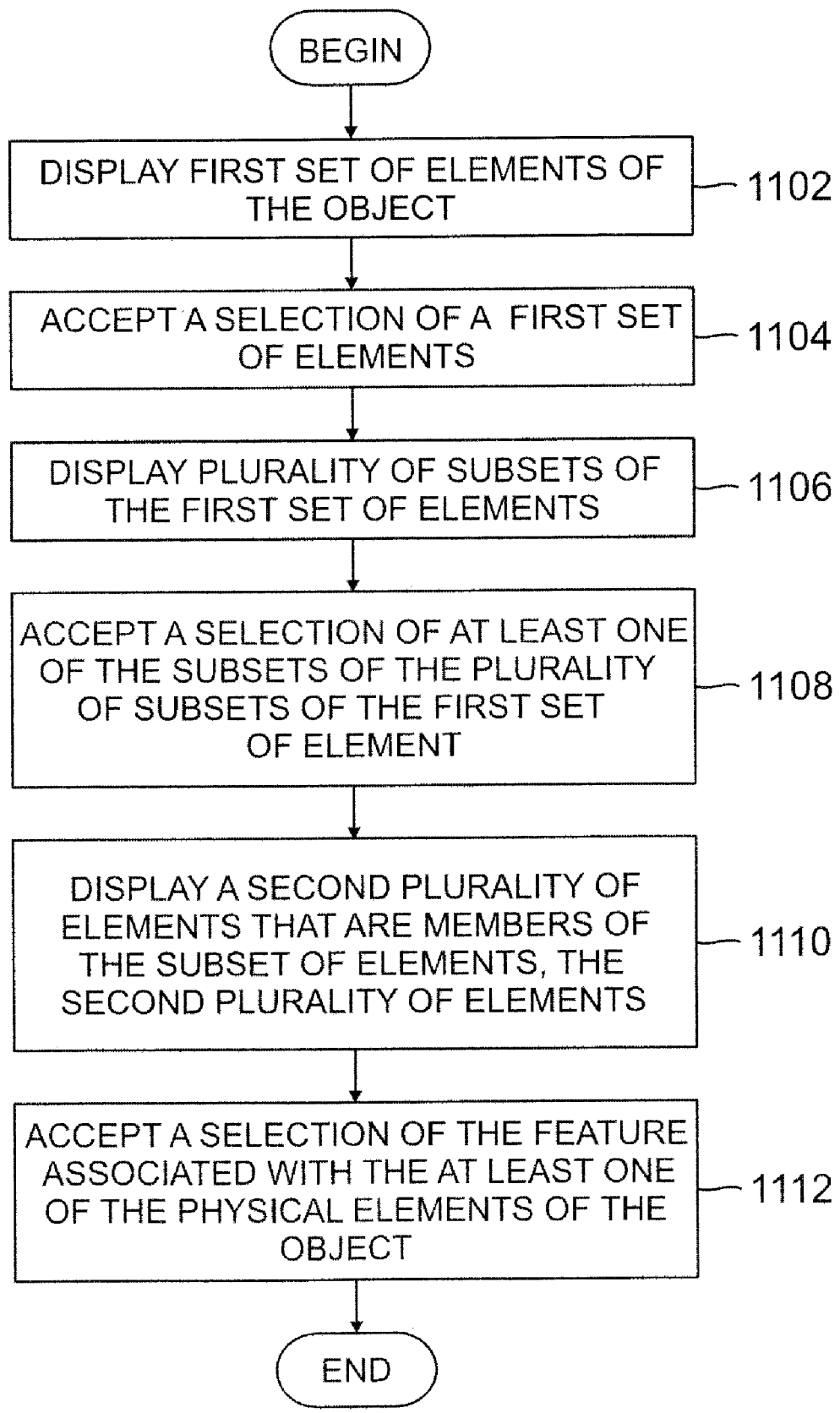
FIG. 11 is a flow chart presenting exemplary steps that can be used to select the element of interest.

FIG. 11 is a flow chart presenting exemplary steps that can be used to select the element of interest. First, a first set of elements of the object is displayed, as shown in block 1102. One example of such a display is the radar diagram 1000 shown in FIG. 10 (with each control region 1002 associated with an element or set of elements). Next, at least one of the elements is selected, as shown in block 1104, and a plurality of subsets of the first set of elements is displayed, as shown in block 1106.

Figure 12:
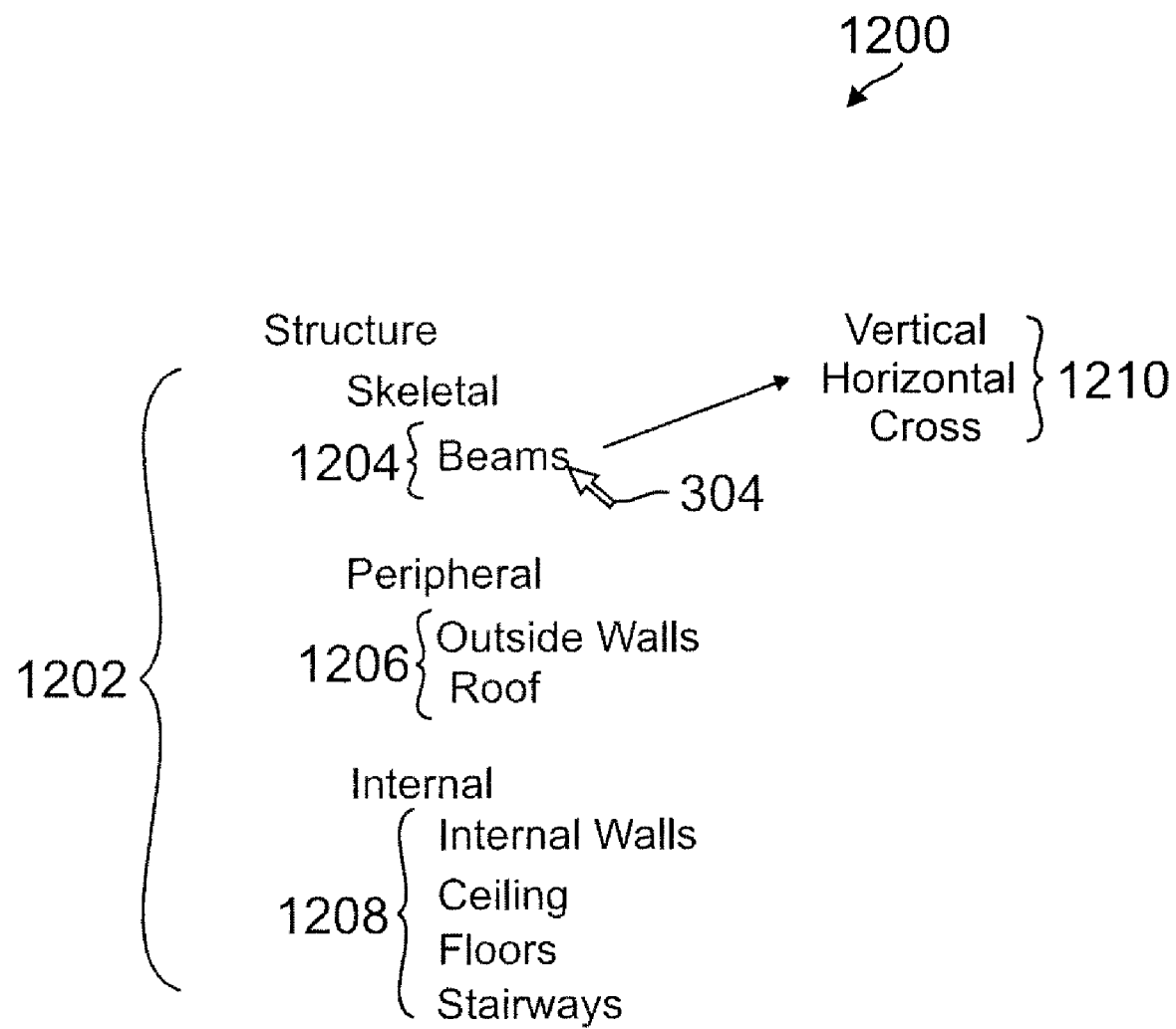
FIG. 12 is a diagram illustrating a user interface that might be presented after selection of the structure element or set of elements by selecting control region of FIG. 10.

FIG. 12 is a diagram illustrating a user interface 1200 that might be presented after selection of the structure element or set of elements 1202 by selecting control region 1002D of FIG. 10. The user interface 1200 presents a plurality of subsets of the set of physical elements relating to the structure element set 1202. These include a skeletal subset 1204 (which includes beams), a peripheral subset 1206 (which includes outside walls, and a roof) and an internal subset 1208 (which includes internal walls, ceilings, floors, and stairways).

Next, a selection of at least one of the subsets of the plurality of subsets of the first set of elements is accepted, as shown in block 1108. This can be accomplished, in the illustrated example of FIG. 12, by selecting either "skeletal" or beams. A second plurality of physical elements that are members of the subset of physical elements is then displayed, as shown in block 1110, and a selection of a feature associated with at least one of the physical elements of the object is accepted, as shown in block 1112.

In the illustrated example of FIG. 12, vertical, horizontal, and cross beam physical elements/element sets 1210 are displayed. A selection of one of these elements can be made, thus hierarchically isolating the elements from the other elements of the object. For example, if the user were to select vertical beams, the vertical beam elements of the building would be selected as the element of interest. Following this step, the user interface 500 is updated to provide a feature that the user can use to highlight the physical object of interest. For example, if the user had selected vertical beams as the element of interest, information regarding the recycled composition of the vertical beams may be presented in graphical portion 502A, and the user may then move the graphic representing this information to the rendering portion 502B to command the computer program to filter the model to show vertical beams. Alternatively, the radar diagram may be updated such that the "structure" control region 1002D becomes a "vertical beam" control region, and selecting the vertical beam control region commands the desired filtering and display.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for visualizing a quantity of a material used in a building having a plurality of physical elements in connection with designing the building to comply with an environmental design material composition requirement, comprising the steps of:
   (a) concurrently displaying a visual representation of a model of the building, a data category having a plurality of data points, and a display feature presenting graphical information quantifying a material composition of at least one of the physical elements of the building associated with the environmental design material composition requirement according to a user-selected one of the plurality of data points on a display coupled to a computer;
   (b) accepting a selection of the presented graphical information in the computer from the user;
   (c) filtering the model according to the selected presented graphical information to highlight the physical element of the building associated with the selected graphical information; and
   (d) displaying a visual representation of the filtered model.

2. The method of claim 1, wherein:
   the presented graphical information comprises a radar diagram comprising:
      a graph having a radial line extending from a center of the radar diagram for at least some of the physical elements of the building;
      a data point on each of the radial lines, each data point quantifying a parameter associated with the physical element of the building associated with the radial line;
      a control region at the end of each of the radial lines, each control region associated with the physical element of the of the building associated with the radial line; and
   the step of accepting a selection of the presented graphical information comprises the step of selecting the control region associated with a physical element of interest to the user.

3. The method of claim 1, further comprising the step of:
   repeatedly performing steps (b)-(d) to optimize a design of the building.

4. The method of claim 1, wherein the step of accepting a selection of the presented graphical information comprises the step of:
   moving the presented graphical information to a location proximate of the visual representation of the model of the building.

5. An apparatus for visualizing a quantity of a material used in a building having a plurality of physical elements in connection with designing the building to comply with an environmental design certification material composition requirement, comprising:
   means for concurrently displaying a visual representation of a model of the building, a data category having a plurality of data points, and a display feature presenting graphical information quantifying a material composition of at least one of the physical elements of the building associated with the environmental design material composition requirement according to a user-selected one of the plurality of data points on a display coupled to a computer;

means for accepting a selection of the presented graphical information in the computer from the user;

means for filtering the model according to the selected presented graphical information to highlight the physical element of the building associated with the selected presented graphical information; and means for displaying a visual representation of the filtered model.

6. The apparatus of claim 5, wherein:

the presented graphical information comprises a radar diagram comprising:

a graph having a radial line extending from a center of the radar diagram for at least some of the physical elements of the building;

a data point on each of the radial lines, each data point quantifying a parameter associated with the physical element of the building associated with the radial line;

a control region at the end of each of the radial lines, each control region associated with the physical element of the of the building associated with the radial line; and the means for accepting a selection of the presented graphical information comprises the step of selecting the control region associated with a physical element of interest to the user.

7. The apparatus of claim 5, wherein the means for accepting a selection of the presented graphical information comprises means for moving the presented graphical information to a location proximate of the visual representation of the model of the building.

8. A computer system for visualizing a quantity of a material used in a building having a plurality of physical elements in connection with designing the building to comply with an environmental design material composition requirement, comprising:

a processor; and a memory coupled to the processor, the memory storing one or more instructions for performing a computer program modeling the physical object and for presenting the visualized quantity of material used in the physical object, wherein the instructions comprise instructions for performing steps comprising the steps of:

concurrently displaying a visual representation of a model of the building, a data category having a plurality of data points, and a display feature presenting graphical information quantifying a material composition of at least one of the physical elements of the building on a display coupled to a computer, wherein the quantified material composition is associated with the environmental design material composition requirement;

accepting a selection of the presented graphical information in the computer from the user;

filtering the model according to the selected presented graphical information to highlight the physical element of the building associated with the selected presented graphical information; and displaying a visual representation of the filtered model.

9. The computer system of claim 8, wherein:

the presented graphical information comprises a radar diagram comprising:

a graph having a radial line extending from a center of the radar diagram for at least some of the physical elements of the building;

a data point on each of the radial lines, each data point quantifying a parameter associated with the physical element of the building associated with the radial line;

a control region at the end of each of the radial lines, each control region associated with the physical element of the of the building associated with the radial line; and the step of accepting a selection of the presented graphical information comprises the step of selecting the control region associated with a physical element of interest to the user.

10. The computer system of claim 8, wherein the step of accepting a selection of the presented graphical information comprises the step of:

moving the presented graphical information to a location proximate of the visual representation of the model of the building.

* * * * *